(12) United States Patent
Stempniewski et al.

(10) Patent No.: US 9,512,868 B2
(45) Date of Patent: Dec. 6, 2016

(54) ANCHOR FASTENING ELEMENT (75) Inventors: Lothar Stempniewski, Ettlingen (DE); Marco Maisch, Ellingen (DE)

(73) Assignee: Karlsruher Insitut Für Technologie, Karlsruhe (DE)

( * ) Notice: Subject to any disclaimer, the term of this patent is extended or adjusted under 35 U.S.C. 154(b) by 76 days.

(21) Appl. No.: 14/003,605

(22) PCT Filed: Mar. 7, 2012

(86) PCT No.: PCT/EP2012/001007
§ 371 (c)(1),
(2), (4) Date: Oct. 25, 2013

(87) PCT Pub. No.: WO2012/119763
PCT Pub. Date: Sep. 13, 2012

(65) Prior Publication Data
US 2014/0050550 A1    Feb. 20, 2014

(30) Foreign Application Priority Data
Mar. 8, 2011    (DE) .................. 10 2011 012 955

(51) Int. Cl.
F16B 13/04    (2006.01)
F16B 31/00    (2006.01)
F16B 13/06    (2006.01)
F16B 13/14    (2006.01)
F16B 33/00    (2006.01)

(52) U.S. Cl.
CPC ............. F16B 31/00 (2013.01); F16B 13/065 (2013.01); F16B 13/141 (2013.01); F16B 33/00 (2013.01)

(58) Field of Classification Search
CPC ...... F16B 13/065; F16B 13/066; F16B 35/041
USPC .................. 411/60, 1, 424, 55, 392
See application file for complete search history.

(56) References Cited

U.S. PATENT DOCUMENTS

|  |  |  |  |  |
|---|---|---|---|---|
| 36,014 A | * | 7/1862 | Meissner | 411/392 |
| 2,060,593 A | * | 11/1936 | Schaurte | F16B 31/06 |
|  |  |  |  | 411/378 |
| 3,077,809 A | * | 2/1963 | Harding et al. | 411/33 |
| 4,229,875 A | * | 10/1980 | Crispell | B21K 1/44 |
|  |  |  |  | 29/452 |
| 4,656,806 A |  | 4/1987 | Leibhard et al. |  |

(Continued)

FOREIGN PATENT DOCUMENTS

| DE | 3445713 A1 | 6/1986 |
|---|---|---|
| DE | 3710964 | 10/1988 |

(Continued)

OTHER PUBLICATIONS

International Preliminary Report on Patentability/Written Opinion, Int. Serial No. PCT/EP2012/001007, Int. Filing Date: Mar. 7, 2012, English Translation.

(Continued)

Primary Examiner — Flemming Saether
(74) Attorney, Agent, or Firm — Reising Ethington P.C.

(57) ABSTRACT

Anchor fastening element for fastening an object to a wall having a drilled hole, which comprises a threaded bolt having a threaded portion at one end and an anchor portion at the other end and also having a shank portion in between. The threaded portion and the anchor portion have a low ductility and the shank portion has a higher ductility.

16 Claims, 4 Drawing Sheets

(56) References Cited

U.S. PATENT DOCUMENTS

| | | | |
|---|---|---|---|
| 4,947,502 A * | 8/1990 | Engelhardt | A61B 17/86 411/392 |
| 4,971,494 A * | 11/1990 | Gauthier et al. | 411/55 |
| 5,076,746 A * | 12/1991 | Fischer et al. | 411/55 |
| 5,102,276 A * | 4/1992 | Gourd | F16B 33/006 411/383 |
| 5,375,946 A * | 12/1994 | Locotos | 405/259.4 |
| 5,570,976 A * | 11/1996 | Fuller et al. | 405/302.2 |
| 5,755,542 A * | 5/1998 | Janusz | C21D 9/0093 248/58 |
| 6,086,305 A * | 7/2000 | Lat | B21G 3/00 411/440 |
| 6,676,346 B1 * | 1/2004 | Frischmann et al. | 411/32 |
| 8,091,317 B2 * | 1/2012 | Brackett | 52/742.14 |
| 8,678,730 B2 * | 3/2014 | Gaudron et al. | 411/60.1 |
| 8,707,605 B2 * | 4/2014 | Jamison | 42/75.03 |

FOREIGN PATENT DOCUMENTS

| | | |
|---|---|---|
| EP | 0289729 A1 | 11/1988 |
| GB | 2141804 A | 1/1985 |
| JP | S57124107 | 8/1982 |
| JP | S63138995 | 6/1988 |
| JP | H08105593 | 4/1996 |
| JP | H09184203 | 7/1997 |

OTHER PUBLICATIONS

Japanese Office Action, Patent Application No. 2013-557005, Dated: Nov. 10, 2014.

PCT International Search Report Mail Date: May 14, 2012 PCT App No. PCT/EP2012/001007 Filing Date: Mar. 7, 2012.

EP Office Action, Serial No. 12 709 511.5-1760, Applicant: Karlsruher Institut Fur Technologie, Mail Date: Jan. 15, 2016.

* cited by examiner

ANCHOR FASTENING ELEMENT

TECHNICAL FIELD

The present disclosure relates to an anchor fastening element for fastening an object in a drilled hole in a concrete part that defines an anchoring base.

BACKGROUND

Anchors for fastening objects to building walls are known in various shapes. If exceptional loads are expected, spreading anchors are used, inter alia, which are very rigid fastening means and as such exhibit little resilience and thus lead to a rigid connection between the object to be fastened and the building wall. A rigid connection does not exhibit energy dissipating behavior.

From DE 40 14 522 A1 a fastening element is known for being anchored in a drilled hole in a concrete part, which is able to absorb impact loads such as those occurring upon severe vibrations or earthquakes in order to avoid chipping of the drilled hole or breaking of the bolt. The fastening element comprises a threaded bolt having a spreading cone at its free end, and a spreading sleeve with longitudinal slots which define spreading segments. The threaded bolt comprises a threaded portion, which continues well into the spreading sleeve, then a collar-shaped portion having the same diameter as the inner bore of the spreading sleeve, and finally a shallow necking in front of the spreading cone. The inner bore of the spreading sleeve has a cylindrical portion of increased wall thickness overlapping with the spreading cone, and the wall thickness is reduced over the shallow necking and merges into the initial wall thickness of the spreading sleeve. Thereby, a flat annular space is formed, into which the spreading cone may be deformed in the event of an axial overload, in order to absorb the impact overload. In this case, the threaded bolt will slip out of the spreading sleeve a bit, and the object to be fastened will be offset from the wall in which the fastening element is anchored. Only little energy is absorbed during the deformation of the spreading sleeve.

From DE 37 109 64 A, a fastening element is known for use in a drilled hole of a solid masonry, wherein a threaded bolt has a spreading body at its end and cooperates with a spreading sleeve having two consecutive spreading regions which are interconnected through a predetermined breaking region that breaks in case of an overload. In this way it is avoided that the fastening element becomes disengaged from the drilled hole, even upon excessive vibrations such as those occurring in case of earthquakes.

From DE 93 103 57 U a spreading anchor is known for being fastened in an anchoring bore, wherein a spreading portion of the anchor sleeve is expanded, with a backlash reserve formed by a thickness reduction of the wall recessed from the inside, which is plastically deformable upon gripping of the spreading portion of the anchor sleeve which results in a shortening of the anchor length.

In conjunction with spreading anchors, a damping device is known (DE 10 2008 063 580 A1), which is intended for attenuating impact loads such as in case of earthquakes. An elastomeric sleeve encloses the threaded bolt of the spreading anchor and is compressed when tightening the nut, so that the elastomeric sleeve is pre-stressed free of play in a bore of the component to be fastened.

Adhesively secured anchors are widely known (DE 202 01 927 U1, EP 1 936 212 A2).

From DE 32 20 460 C1, a rock anchor is known, which comprises a tension member having ends of mild steel and a central compliance zone of stainless austenitic steel, and an anchor plate to prevent the rock from breaking off in galleries and spaces in underground mining and tunneling constructions. The ends of the tension member are adhesively secured to the rock. To achieve a high adjustment force, the austenitic central portion of the anchor is strain-hardened.

GENERAL DESCRIPTION

An object of the present disclosure is to provide a fastening element for fastening an object in a drilled hole in a concrete part, which is to absorb violent impact loads such as those occurring during earthquakes in an energy dissipating manner.

The fastening element comprises a threaded bolt having a threaded portion at one end, an anchor body at the other end, and a shank portion therebetween. The threaded bolt is made of metal exhibiting a low ductility behavior in its threaded portion and a higher ductility behavior in its shank portion. The anchor body which is formed integrally with or separately from the threaded bolt has a low ductility. By means of a nut, and optionally by using an anchor plate, objects may be fastened to a wall or the like. During earthquakes mass forces may occur which act on the threaded bolt in the longitudinal direction and/or in the transverse direction thereof and which are so heavy that the elastic limit of the material is exceeded. In this event, a plastic deformation will occur only in the shank portion of the threaded bolt, whereby impact energy is absorbed so that an abrupt breaking of the threaded bolt will be avoided.

The anchor fastening element is designed for reversible loads, i.e. loading is followed by relief and subsequent reloading, etc. Any combination of tensile force and shear force may occur. It is possible that a shear force occurs even without any tensile force in the longitudinal direction of the anchor. A clearance around the shank portion allows for a constant bending of the shank portion and thus for energy absorption from seismic waves propagating transversely to the shank.

In order to achieve the desired ductility behavior of the shank portion, the shank portion may be formed with a reduced cross section as compared to the cross section of the threaded portion and the cross section of the anchor portion. In this manner, the stretching ductility and bending ductility of the shank portion may be exploited for the purposes of energy dissipation during earthquakes.

In order to exploit the bending ductility or displacement ductility of the shank portion for the purposes indicated, a radial clearance is provided around the shank portion within the drilled hole, at least near the threaded portion. The shank portion may then bend within the drilled hole like a clamped beam and may absorb energy from the seismic wave when the bending elastic limit is exceeded, so preventing a dangerous breaking of the threaded bolt.

If the ductility of a support element is concerned, it is called global ductility, since it depends not only on the material but also on the shape of the support element and the nature of the load (see, for example, Hugo Bachmann, "Erdbebensicherung von Bauwerken" (Seismic Design of Structures), 2nd revised edition, Chapter 3.5, Birkenhauser Verlag, 2002, ISBN 3-7643-6941-8). This global ductility should be at least 1.5, that means the ratio of the amount of plastic deformation to the amount of elastic deformation is greater than 1.5. For normal anchors for earthquake zones a range of the global ductility from 2 to 4 is suggested. In particularly important constructions a global ductility greater than 4 or 5 is selected.

The anchor portion has no ductility or a low ductility and may be attached at the end of the drilled hole for example using an adhesive, or an anchor sleeve is provided having spreading segments which fix the anchor portion of the threaded bolt on the bottom of the drilled hole. In the latter case, the fastening element is referred to as a spreading anchor.

Thus, the novel spreading anchor comprises a threaded bolt having a threaded portion at the first end, an spreading portion at the other, second end, and a shank portion therebetween. A cylindrical anchor sleeve is provided which has a round cross section and spreading segments at the end adjacent the spreading portion. A nut, optionally with a washer, is used to secure an anchor plate and thus the object to be fastened at the spreading anchor and the anchoring base. The shank of the threaded bolt has a stretching portion of reduced cross section extending within the anchor sleeve. At least the shank is made of ductile material which is able to plastically deform when a critical load is exceeded and thereby absorbs kinetic energy and converts it into deformation energy. Shear forces acting on the spreading anchor can be mitigated by plastic bending deformation of the shank, while excessive axial forces are relieved by a stretching deformation of the shank. On the whole, impact energy acting on the fastened object is thereby partially dissipated, so that the risk of a damage to the drilled hole is reduced. Although it is in particular possible during a temporary occurrence of seismic shocks that the threaded bolt of the spreading anchor becomes elongated so that the fastened object is still retained, but it will not break during the short exposure time of an earthquake. Similarly, lateral impact forces will cause a bending of the shank made of ductile material, however the shank will not be sheared off. In this way, the risk for fastened objects to fly around upon an occurrence of seismic shocks is counteracted.

The spreading anchor is a heavy-duty anchor and may be designed in two configurations, namely for being mounted in a cylindrical drilled hole, or in such a hole which additionally has an undercut. The two configurations differ in the extent of the spreading movement of the spreading segments. In a purely cylindrical drilled hole, the spreading segments only need to be slightly spread apart in order to cling to the wall of the drilled hole and thereby to prevent the risk for the spreading anchor to be pulled out of the drilled hole when tightening the threaded bolt during installation of the spreading anchor. In case of a drilled hole having an undercut, a larger spreading of the spreading segments is employed thereby greatly enhancing the retaining force of the spreading anchor in the drilled hole while reducing the risk of pulling out the spreading anchor from the drilled hole.

For both configurations, an anchor sleeve is preferred which prior to being installed is cylindrical over its entire outer circumference except for a bending notch for the spreading segments. To promote the spreading function of the spreading segments, a wall thickening is provided at the inner diameter of the anchor sleeve in the region of the spreading segments, which at least partially engages the spreading portion, in order to achieve low friction spreading of the spreading segments during installation of the spreading anchor by relative axial displacement between the anchor sleeve and the spreading portion. The extent of relative axial displacement differs depending on the configuration: in case of a cylindrical drilled bore without undercut the extent of relative displacement is small, and it is large in case of a cylindrical drilled hole having an undercut.

For an optimum performance of the spreading anchor the ductile material property may be substantially concentrated on the shank portion of the threaded bolt, while the threaded portion and the spreading portion should be harder than the ductile material. This also applies to the anchor sleeve. In this manner it is ensured that energy dissipation substantially occurs in the ductile shank.

Wrought iron steel may be considered as a suitable material for the threaded bolt, which may be hardened in the region of the threaded portion and the spreading portion, but which is left unhardened in the region of the shank portion. Wrought iron steel refers to all iron alloys that are malleable to be stretched and that can be hardened in portions thereof while other portions remain unhardened.

Other suitable materials for the threaded bolt of the spreading anchor include copper alloys, e.g. bronze or brass.

For the anchor sleeve, a rigid material such as steel is preferred. But there may also exist applications in which a ductile material is chosen for the anchor sleeve to achieve energy dissipation therein too. Even tough plastics may be considered as a material for the anchor sleeve to meet specific requirements in terms of water tightness and the like.

The spreading portion made of a material harder than the ductile material of the bolt shank has a conical shape and a shoulder towards the stretching portion. It is possible to provide a spreading portion by screw-fastening a spreading body to the second end of the threaded bolt, or to move it axially by means of a screw thread. This design may facilitate an exchange of a deformed threaded bolt after an earthquake when an object that became loose is to be re-fastened.

DESCRIPTION OF THE DRAWINGS

Embodiments of the present disclosure will now be described with reference to the drawings, wherein.

DETAILED DESCRIPTION

Figure 1:
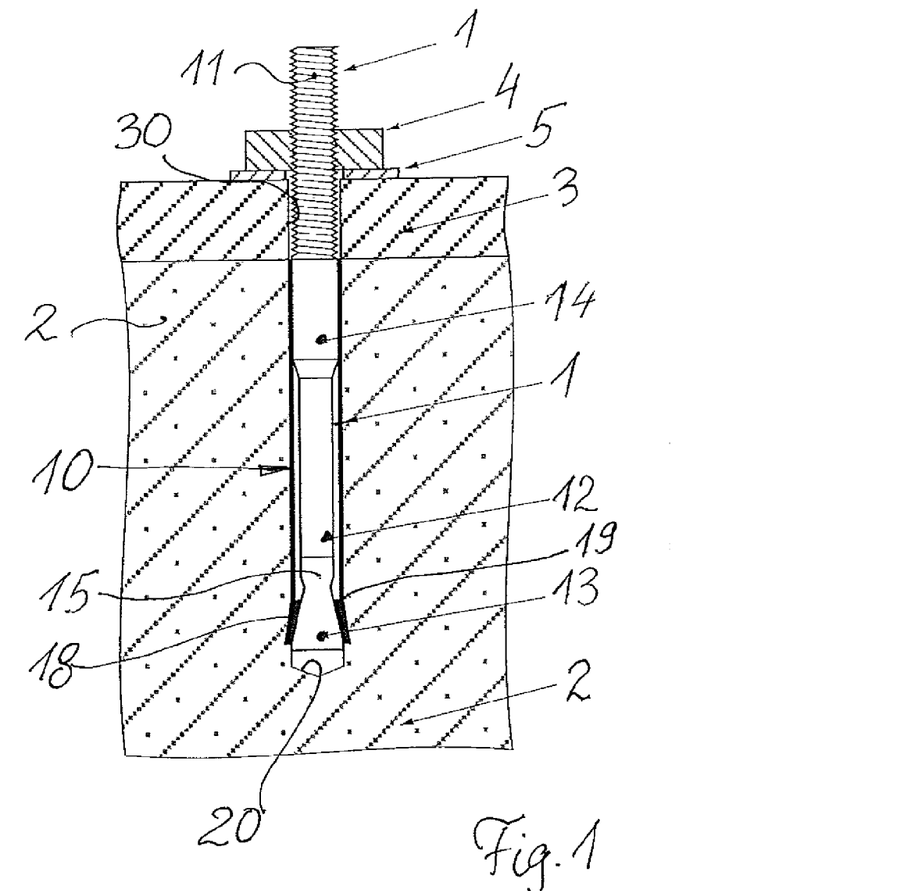
FIG. 1 shows a longitudinal section through a spreading anchor in an installed condition.

FIG. 1 shows a spreading anchor installed in a bore 20 of a concrete wall 2 to fix an object to the wall 2, with an anchor plate 3 of the object being shown having a through-bore 30. For this purpose, a nut 4 and a washer 5 is used to press the anchor plate 3 against the wall 2. The spreading anchor comprises an anchor sleeve 10 and a threaded bolt 1.

Figure 1A:
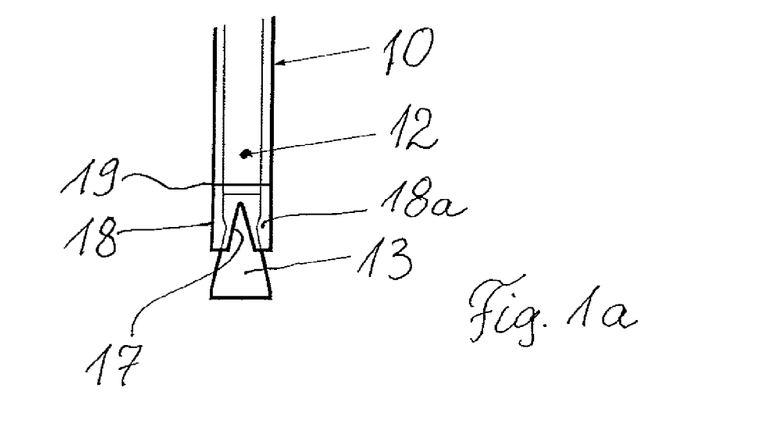
FIG. 1a is a detail of FIG. 1.
Figure 2:
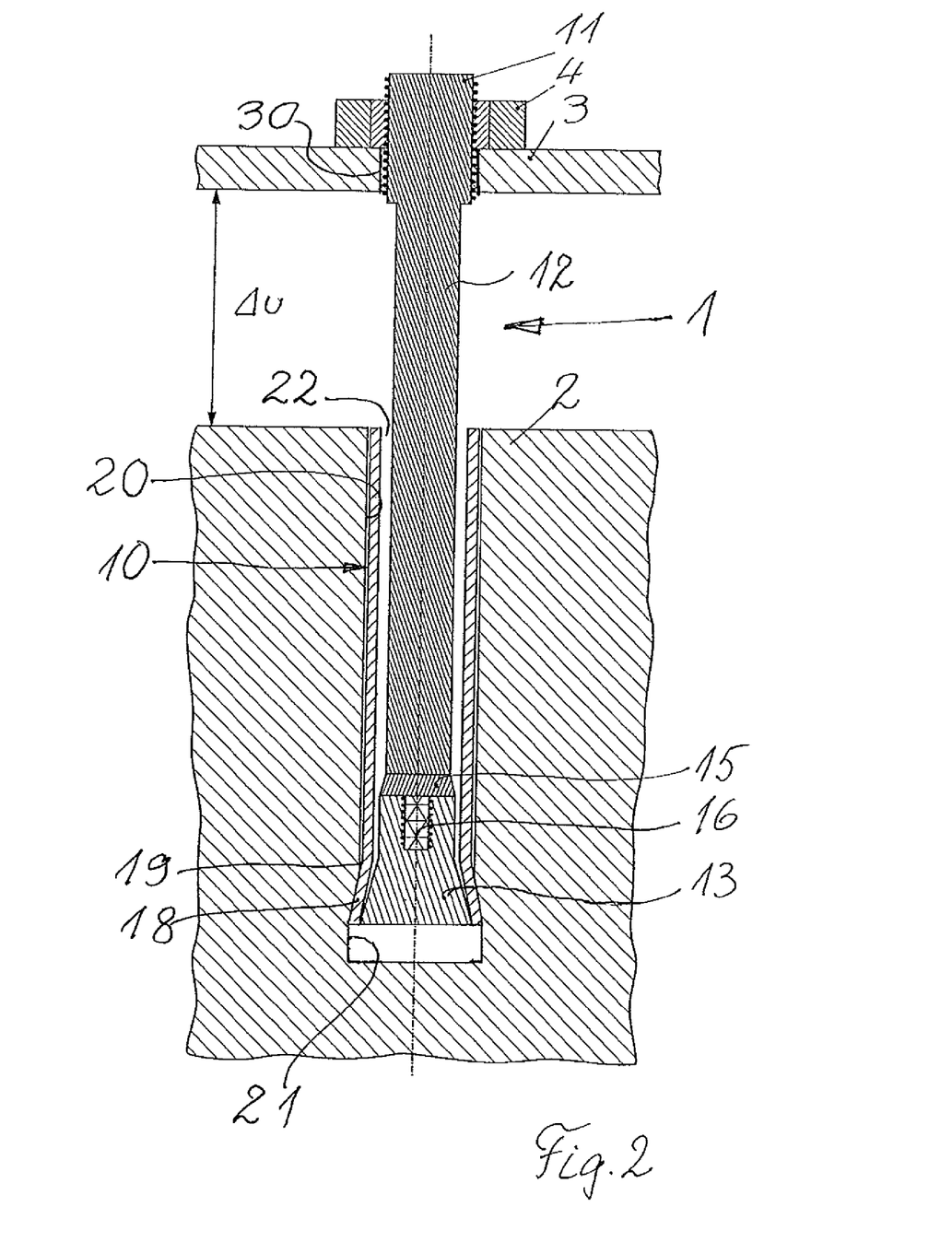
FIG. 2 shows a spreading anchor deformed by elongation.

Threaded bolt 1 has several portions, namely a threaded portion 11, a shank or stretching portion 12, and an spreading portion 13. A support portion 14 may be provided for connecting the threaded portion 11 to the shank 12. If good ductility in the transverse direction is important, the support portion 14 is omitted to provide a clearance 22 around the shank portion 12 of the threaded bolt, as illustrated in FIG. 2. The support portion 14 (if present) has an outer diameter corresponding to the inner diameter of the anchor sleeve 10. Compared thereto, the shank or stretching portion 12 has a reduced cross section, which may range from 70 to 90% of the full cross section. Spreading portion 13 is connected with stretching portion 12 through a shoulder 15 and has, except for the shoulder 15, a tapering or conical shape with a base cross section corresponding to the cross section of the bore 20. Anchor sleeve 10 is slotted at its end adjacent to the spreading portion, and the slots 17 (FIG. 1a) may have a triangular shape, but other slot shapes are likewise possible, for example with a circular recess at the bottom of the slot. Due to these slots 17, the lower end of anchor sleeve 10 is divided into individual spreading segments 18, which may be separated from the rest of the anchor sleeve 10 by a bending notch 19. The inner surface of the anchor sleeve 10 may be of a uniformly round cylindrical shape, but it is also possible to provide a wall thickening 18a in the region of the spreading segments 18. The contour of the thickened wall portion at least partially follows the outline of the spreading body 13 and prevents the ends of the spreading segments from digging into the spreading body during spreading of the spreading segments.

Figure 3:
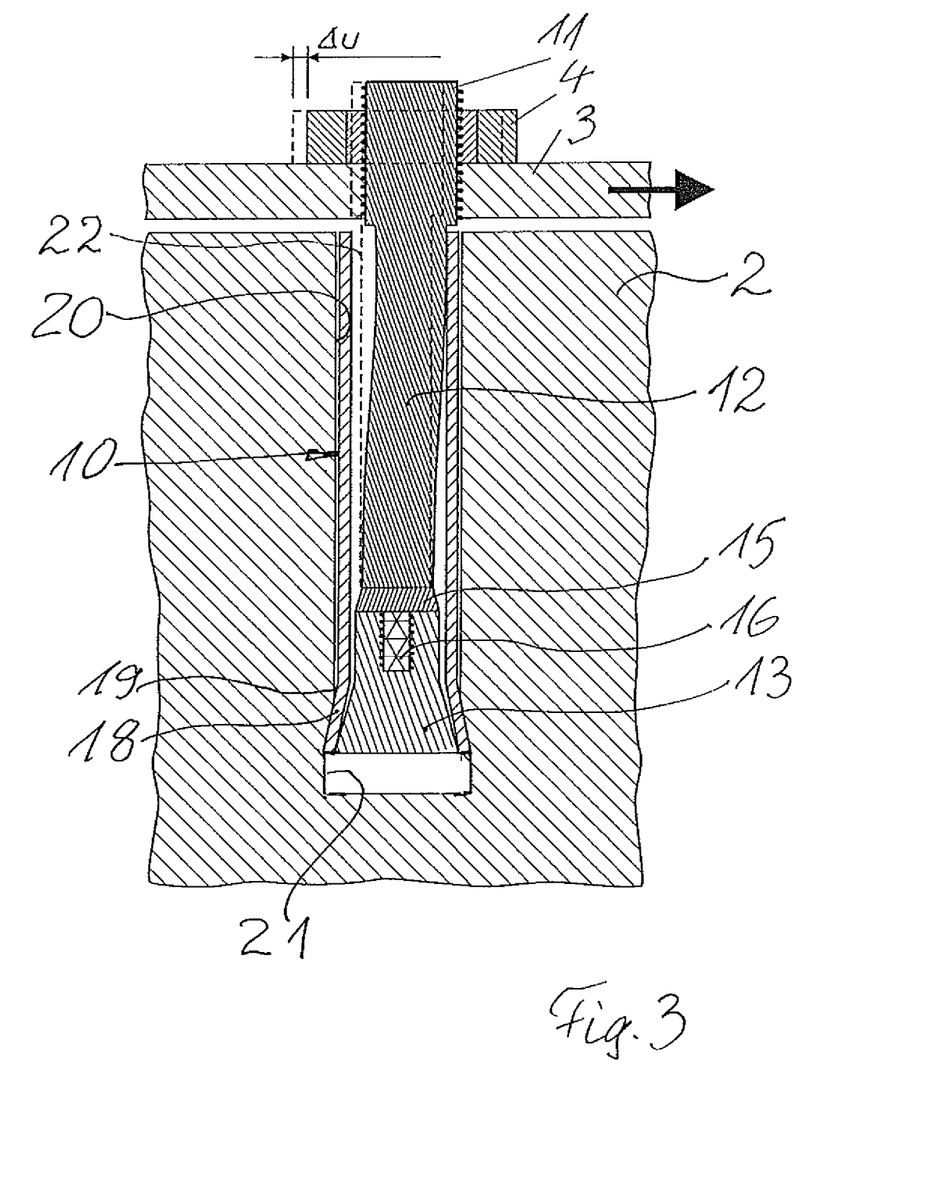
FIG. 3 shows a spreading anchor deformed by bending.

FIG. 2 shows another embodiment of a spreading anchor, in a longitudinally stretched state thereof. Portions corresponding to those of the embodiment of FIG. 1 are designated by the same reference numerals. The illustrated spreading anchor is configured for a drilled hole 20 having an undercut 21. Furthermore, the threaded bolt 1 is formed in two parts, namely by having the spreading portion 13 screwed to the shoulder 15 of threaded bolt 1 by means of a screw neck 16. While the shank portion 12 is made of ductile material, portions 11, 15, 16, 13 have a lower ductility. In contrast to the embodiment of FIG. 1, there is no support portion 14 provided, so that there exists a radial clearance 22 between shank portion 12 and anchor sleeve 10. At the inlet end of clearance 22, a guide ring (not shown) may be provided, which consists of crushable material to allow for lateral displacement of the shank 12, as shown in FIG. 3. The latter shows the spreading anchor of FIG. 2 with the shank portion 12 bent, as it can be caused by impact forces transversely to the longitudinal extent of the anchor.

Figure 4:
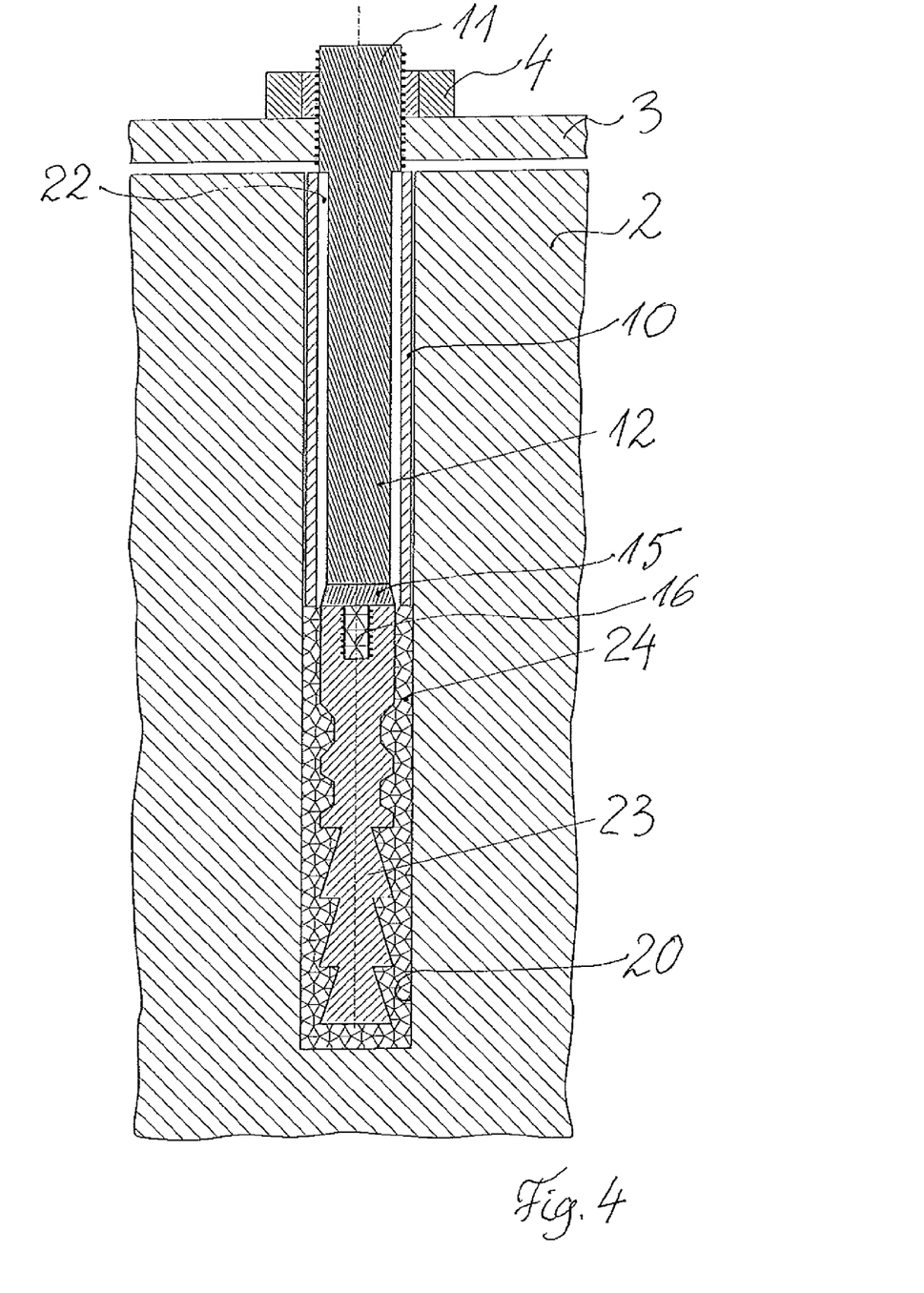
FIG. 4 shows an adhesive anchor.

FIG. 4 illustrates an adhesive anchor 23, which is connected to a shank 12 of a threaded bolt which serves as the anchor fastening element. Adhesive anchor 23 is fixed in the bore 20 of a concrete wall 2 by means of an adhesive 24. The shape of the adhesive anchor 23 is adapted to this purpose. The remaining portions correspond to those of threaded bolt 1 of FIG. 1 or 2.

The particularity of the anchor fastening element according to the present disclosure is the use of a material of enhanced ductility for certain portions or regions of the element. A ductile material refers to a material which exhibits elastic characteristics up to a certain load, the yield strength or yield point, and which is plastically deformable when exceeding the yield point up to an ultimate strength or breaking limit. The ductility indicates the ratio between the maximum deformation and the elastic deformation of a material body. In conjunction with the present disclosure it is intended that different portions of the anchor fastening element exhibit a different ductile behavior, either by using two materials of different ductility, or by differently dimensioning or differently treating portions of the respective part so that it behaves like materials of different ductility.

A material particularly suitable for the threaded bolt 1 is wrought iron steel, i.e. a steel with a low carbon content. By carburization in the region of threaded portion 11 and spreading portion 13, the hardness of the material may be increased and thus the deformability (local ductility) thereof may be reduced, so that a threaded bolt is formed like one made of two materials of different ductility. The shank or stretching portion 12 which is left unhardened has a much higher ductility than threaded portion 11 or spreading portion 13, so that the deformation of the anchor fastening element in the event of an overload substantially occurs only in the shank portion.

A ductile material likewise suitable for the threaded bolt 1 is a copper alloy such as bronze or brass. With such material, portions of different strengths and thus of different ductility may likewise be obtained by appropriate treatment.

As for the material of the anchor sleeve 10, especially steel will be considered. Under heavy loads in the longitudinal and transverse directions, the strength thereof will prevent the drilling hole 20 from chipping, so that the deformation energy introduced will substantially become noticeable in the shank.

If part of the impact energy during an earthquake is to be absorbed by the anchor sleeve, a copper alloy such as bronze or brass will also come into consideration as a material for the anchor sleeve. Copper alloys are very ductile and are therefore able to absorb impact energy by deformation.

If the risk for chipping of the drilled hole is not very large, perhaps because the wall material consists of very strong concrete, elastomeric viscoplastic plastics will also come into consideration as a material for the anchor sleeve.

The ductility distribution in the anchor fastening element may be modified. For example, it is possible to provide a transition zone between threaded portion 11 and shank portion 12, in which the material property gradually changes from lower to higher ductility. The transition zone should come to lie in the region of the interface between attached object 3 and concrete wall 2 to reduce the risk for the threaded bolt 1 to shear off in the region of threaded portion 11, i.e. threaded portion 11 should terminate within throughbore 30.

In case of a so-called undercut anchor which is to be mounted in a drilled hole 20 having an undercut 21 (FIG. 2, 3), the threaded bolt 1 may be extended in the region of stretching portion 12 in terms of thread 16 and may extend into spreading body 13, in order to obtain a displacement of the spreading body 13 relative to threaded bolt 1 and thus also relative to the anchor sleeve 10 by rotating the threaded bolt 1 which may be formed with an Allen key (not shown). This relative displacement serves for spreading the spreading segments 18 in the undercut portion 21 of the drilled hole 20. It will be understood that for this design of an undercut anchor a locally high strength material will be selected for the thread 16 which extends into the spreading body.

The installation of the spreading anchor depends on whether the anchor is an undercut anchor for undercut drilling holes (2, 3) or a self-undercutting heavy-duty anchor (FIG. 1) which produces a certain undercut by itself during the installation process.

For a self-undercutting heavy-duty anchor, a round cylindrical drilled hole 20 is provided in an anchoring base, as shown in FIG. 1. The spreading anchor with the anchor sleeve 10 sitting on spreading body 13 is introduced into the drilled hole 20, and a relative displacement is caused between anchor sleeve 10 and threaded bolt 1 such that the spreading segment end 18 of anchor sleeve 10 slides over spreading body 13. For this operation, a setting tool may be used. It is also possible to interpose an auxiliary sleeve and to tap to the anchor sleeve 10 with a hammer to allow the spreading segments 18 to penetrate a bit into the bore wall 20. Then, the anchor plate 3 together with the object to be fastened can be attached to the anchoring base 2 using a washer 5 and a nut 4. Tightening of the threaded bolt 1 causes the spreading segments 18 to further bite into the bore wall 20 and to provide good anchoring of the spreading anchor.

If the spreading anchor is configured as a heavy-duty anchor for an extraneously undercut hole, the drilled hole 20 is formed in the anchoring base 2 using a special drill which produces an undercut 21 at the blind end into which the spreading segments 18 may be deployed. This is achieved by displacing the anchor sleeve 10 and the threaded bolt 1 relative to each other in such a manner that the spreading segment end 18 of the anchor sleeve 10 is further slid over the spreading body 13, whereby the spreading segments 18 are spread apart and placed in the undercut 21. This is done in basically the same manner as with the self-undercutting heavy-duty anchor. Once the spreading segments 18 have been spread, the threaded bolt 1 may be tightened to press the anchor plate 3, whereby the material located between the spreading segments 18 and the nut 4 is clamped.

In the event of an earthquake vibrations on buildings will occur that may lead to considerable stresses of the anchor fastening element in the longitudinal or transverse directions. If the fastened object has natural frequencies that correspond to the excitation frequencies of the earthquake, this may lead to an overload of the anchor fastening element. Damping of the vibratory system of fastened object and fastening element will result in a reduction of the overload by detuning the resonance phenomenon. The anchor fastening element according to the present disclosure achieves this by absorbing vibration energy of the earthquake and converting it into deformation energy of the ductile shank of the threaded bolt. Upon occurrence of an overload in the longitudinal direction of the threaded bolt, the shank portion 12 will become elongated as exaggerated at AU in FIG. 2, thereby absorbing seismic energy by plastic deformation of the shank 12, and in case of seismic vibrations transversely to the anchor fastening element the shank portion 12 will be shifted by AU (FIG. 3), also under absorption of energy from the seismic vibrations. The duration of earthquakes is usually less than one minute, so that the accumulated energy introduced during such an earthquake will not be sufficient to lead to a ductile fracture in shank portion 12.

If during an earthquake an anchor fastening element has been damaged, it has to be neutralized or replaced. In case of spreading anchor configurations with a screw thread 16 for attaching or shifting the spreading body 13, the threaded bolt 1 may possibly be unscrewed from the sleeve bore of anchor sleeve 10, so that a replacement of the threaded bolt appears possible. In case of configurations with the spreading body 13 fixedly attached to the threaded bolt 1, the end of the threaded bolt protruding from the anchoring base will be cut off, and a new spreading anchor will be installed at an uninjured point of the anchoring base.

The invention claimed is:

1. An anchor fastening element dimensioned for being fastened in a drilled hole of a concrete part as an anchoring base, and for fastening an object in a manner so as to absorb impact loads on the object such as those occurring during earthquakes in an energy dissipating manner, comprising:
    a threaded bolt of solid, monolithic construction having
        a threaded portion at a first end adapted to receive the object to be fastened between a nut and the concrete part,
        an anchor portion at an opposite, second end, and
        a shank portion between the threaded portion and the anchor portion; and
    a nut to be screwed on the threaded portion for fastening the object to the threaded portion and the concrete part in a mounted condition of the anchor fastening element;
    wherein
    the anchor fastening element is harder in the threaded portion and the anchor portion, than in the shank portion,
    the threaded portion and the anchor portion on the one hand and the shank portion on the other hand are constructed to exhibit a different ductility behavior in the mounted condition of the anchor fastening element,
    the threaded portion and the anchor portion having a lower ductility with less plastic deformation capacity, when in the mounted condition of the anchor fastening element, and
    the shank portion, when in the mounted condition of the anchor fastening element, having a higher ductility with higher plastic deformation capacity adapted to absorb overload impact loads on the object by the shank portion.

2. The anchor fastening element as claimed in claim 1, wherein the shank portion has a reduced cross section as compared to that of the threaded portion.

3. The anchor fastening element as claimed in claim 1, wherein the shank portion finds a radial clearance within the drilled hole near the threaded portion, which is sufficiently large to allow for a plastic deformation of the shank portion corresponding to a global ductility defined as a condition in which a ratio of an amount of plastic deformation to an amount of elastic deformation based on a stretching ductility and a bending ductility of the shank portion when the latter is clamped in the drilled hole due to the anchor portion, the global ductility being greater than 1.5.

4. The anchor fastening element as claimed in claim 3, wherein the global ductility ranges from 2 to 4.

5. The anchor fastening element as claimed in claim 3, wherein the global ductility is greater than 4.

6. The anchor fastening element as claimed in claim 1, which is formed as an adhesive anchor, wherein the anchor portion can be fastened adhesively in the drilled hole.

7. The anchor fastening element as claimed in claim 1, wherein a cylindrical anchor sleeve is provided, which has a round cross section and spreading segments at an end of the anchor sleeve adjacent the anchor portion, to complete the anchor fastening element into a spreading anchor.

8. The anchor fastening element as claimed in claim 7, wherein the anchor sleeve has a thickened wall in the region of the spreading segments, which at least partially engages the anchor portion, in order to obtain a spreading of the spreading segments during installation of the spreading anchor by a relative axial displacement between the anchor sleeve and the anchor portion.

9. The anchor fastening element as claimed in claim 1, wherein the threaded bolt is made of wrought iron steel which is harder in the region of the threaded portion and the anchor portion than in the region of the shank portion.

10. The anchor fastening element as claimed in claim 1, wherein the threaded bolt is made of a copper alloy which is harder in the region of the threaded portion and the anchor portion than in the region of the shank portion.

11. An anchor fastening element dimensioned for being fastened in a drilled hole of a concrete part as an anchoring base, and for fastening an object in a manner so as to absorb impact loads on the object such as those occurring during earthquakes in an energy dissipating manner, comprising:
    a threaded bolt of solid, monolithic construction having a threaded portion at a first end adapted to receive the object to be fastened between a nut and the concrete part, an anchor portion at an opposite, second end, and a shank portion between the threaded portion and the anchor portion; and a nut to be screwed on the threaded portion for fastening the object to the threaded portion and the concrete part in a mounted condition of the anchor fastening element, wherein the threaded portion and the anchor portion on the one hand and the shank portion on the other hand are constructed to exhibit a different ductility behavior in the mounted condition of the anchor fastening element, the threaded portion and the anchor portion having a lower ductility with less plastic deformation capacity, when in the mounted condition of the anchor fastening element, and the shank portion, when in the mounted condition of the anchor fastening element, having a higher ductility with higher plastic deformation capacity adapted to absorb overload impact loads on the object by the shank portion, and the anchor portion is cone-shaped and has a shoulder towards the shank portion, which comprises a material harder than that of the shank portion.

12. In an object fastened to a concrete part by a threaded bolt and a nut, an anchor fastening element comprising:

a threaded bolt of solid, monolithic construction having a threaded portion at a first end, an anchor portion at an opposite, second end, and a shank portion between the threaded portion and the anchor portion, and a nut to be screwed on the threaded portion;

wherein the anchor fastening element being harder in the threaded portion and the anchor portion, than in the shank portion, the threaded portion and the anchor portion on the one hand and the shank portion on the other hand are constructed to exhibit a different ductility behavior, the threaded portion and the anchor portion having a lower ductility with less plastic deformation capacity, and the shank portion having a higher ductility with higher plastic deformation capacity such that overload impact loads on the object are absorbed by the shank portion, which is stretched in an energy dissipating manner as during earthquakes.

13. In an object fastened to a concrete part by a threaded bolt and a nut, an anchor fastening element comprising:

a threaded bolt having a threaded portion at a first end, an anchor portion at an opposite, second end, and between the threaded portion and the anchor portion, a shank portion of solid, monolithic construction; and a nut to be screwed on the threaded portion;

wherein the threaded portion and the anchor portion on the one hand and the shank portion on the other hand are constructed to exhibit a different ductility behavior, the threaded portion and the anchor portion having a lower ductility with less plastic deformation capacity, and the shank portion having a higher ductility with higher plastic deformation capacity such that overload impact loads on the object are absorbed by the shank portion, which is stretched in an energy dissipating manner as during earthquakes, wherein the threaded bolt is made of wrought iron steel.

14. A building wall anchor fastening element for absorbing impact overloads, wherein the fastening element comprises:

a threaded bolt of solid, monolithic construction having a threaded portion at a first end, an anchor portion at an other, second end, and a shank portion between the threaded portion and the anchor portion, the anchor portion is cone-shaped and has a shoulder towards the shank portion wherein the threaded portion and the anchor portion are harder than the shank portion, such that the threaded portion and the anchor portion exhibit ductility behavior different from that of the shank portion, such that the threaded portion and the anchor portion have relatively lower ductility with less plastic deformation capacity and the shank portion has higher ductility with higher plastic deformation capacity.

15. The anchor fastening element as claimed in claim 14, wherein the threaded bolt is made of wrought iron steel that is harder in regions of the threaded and anchor portions than in the region of the shank portion.

16. The anchor fastening element as claimed in claim 14, wherein the threaded bolt is made of a copper alloy that is harder in the region of the threaded portion and the anchor portion than in the region of the shank portion.

* * * * *